OPTICAL SCANNING SYSTEM FOR CHARACTER READER

Filed Nov. 15, 1962 4 Sheets-Sheet 1

INVENTOR.
SEYMOUR KLEIN
BY C. C. Richard Jr.
Attorney

OPTICAL SCANNING SYSTEM FOR CHARACTER READER

Filed Nov. 15, 1962 4 Sheets-Sheet 2

INVENTOR.
SEYMOUR KLEIN
BY C. C. Richard Jr.
Attorney

INVENTOR.
SEYMOUR KLEIN
BY C. C. Richard Jr.
Attorney

OPTICAL SCANNING SYSTEM FOR CHARACTER READER

Filed Nov. 15, 1962

INVENTOR
SEYMOUR KLEIN
BY C. C. Richard Jr.
Attorney

United States Patent Office 3,303,330
Patented Feb. 7, 1967

3,303,330
OPTICAL SCANNING SYSTEM FOR CHARACTER READER

Seymour Klein, Philadelphia, Pa., assignor to Radio Corporation of America, a corporation of Delaware Filed Nov. 15, 1962, Ser. No. 237,949
14 Claims. (Cl. 235—61.11)

This invention relates to a scanning system for an electro-optical printed character reader to derive electrical signals representing the printed characters for use as signals, for example, for a data processing system or the like.

Printed information that is to be processed may be supplied to such a system by recording the information on a recording medium, such as, punched cards or tape or magnetic tape, and by thereafter processing the recording medium in automatic equipment to supply the information in the form of electrical signals to the system. Such a system is limited in speed by the time required for the human operator or operators to process the information onto the recording medium. It is desirable that some means other than human operators be provided to "read" printed numbers or characters (referred to generally as "alpha-numeric" characters) from hard copy, that is, a paper stock or the like with the characters printed on it; and to generate electrical signals representing these characters which may be supplied as input signals to a data processing system, either "on line," that is, supplying the electrical signals directly into the system as they are read, or "off line," that is, supplying the electrical signals to a high speed recording medium for later application to the system.

In the past, several types of devices have been developed for "reading" printed alpha-numeric characters, for example, devices to read characters printed in magnetic ink, devices to read a code pattern printed along with the characters, or electro-optical devices to read the characters themselves by various techniques. This invention is directed to an electro-optical scanning system of the latter category for optically scanning printed characters on a document and generating electrical signals representative of the characters.

Briefly, the invention provides means for scanning the characters on a document with an electro-optical device in a raster to generate a succession of lines of video signals representative of the characters, and to quantize the video signals to provide uniform amplitude quantized video signals. The quantized video signals may thereafter be applied to a data processing system where the characters are identified and utilized, or processed by other equipment to identify the characters and to convert the character information into electrical signals usable by the data system. In order to compensate for variations in the intensity of the video signals from line-to-line caused by variations in the print intensity of the characters or other factors, the video signals in a given scan line are quantized at a fixed fraction or percentage of their maximum amplitude during that line. This action is accomplished by delaying the video signals by one scan line period before quantizing and during the delay period generating a control voltage that is responsive to the maximum amplitude of the video signals during the line. The control voltage and the video signals are simultaneously applied to the quantizing means so that each individual line of video signals is quantized at the proper quantizing fraction or percentage. In addition, further means may be provided for insuring that the peak-to-peak amplitude of the video signals from the electro-optical pickup device are maintained substantially constant, and for adjusting the control voltage of the quantizing means to compensate for variations in the signal gain in the system.

In a particular embodiment of the invention a photoconductive pickup tube, such as a vidicon tube, is used as the electro-optical device to derive the video signals from the document to be read, and means are provided to compensate for the inherent "lag" of the tube. By "lag" is meant the failure of the tube to respond instantaneously to the application and withdrawal of light on its photoconductive target, and to completely discharge each elemental area of its photoconductive target between successive scans of the elemental area.

The invention is more completely described in the following detailed description and shown in the accompanying drawings, in which.

Figure 1:
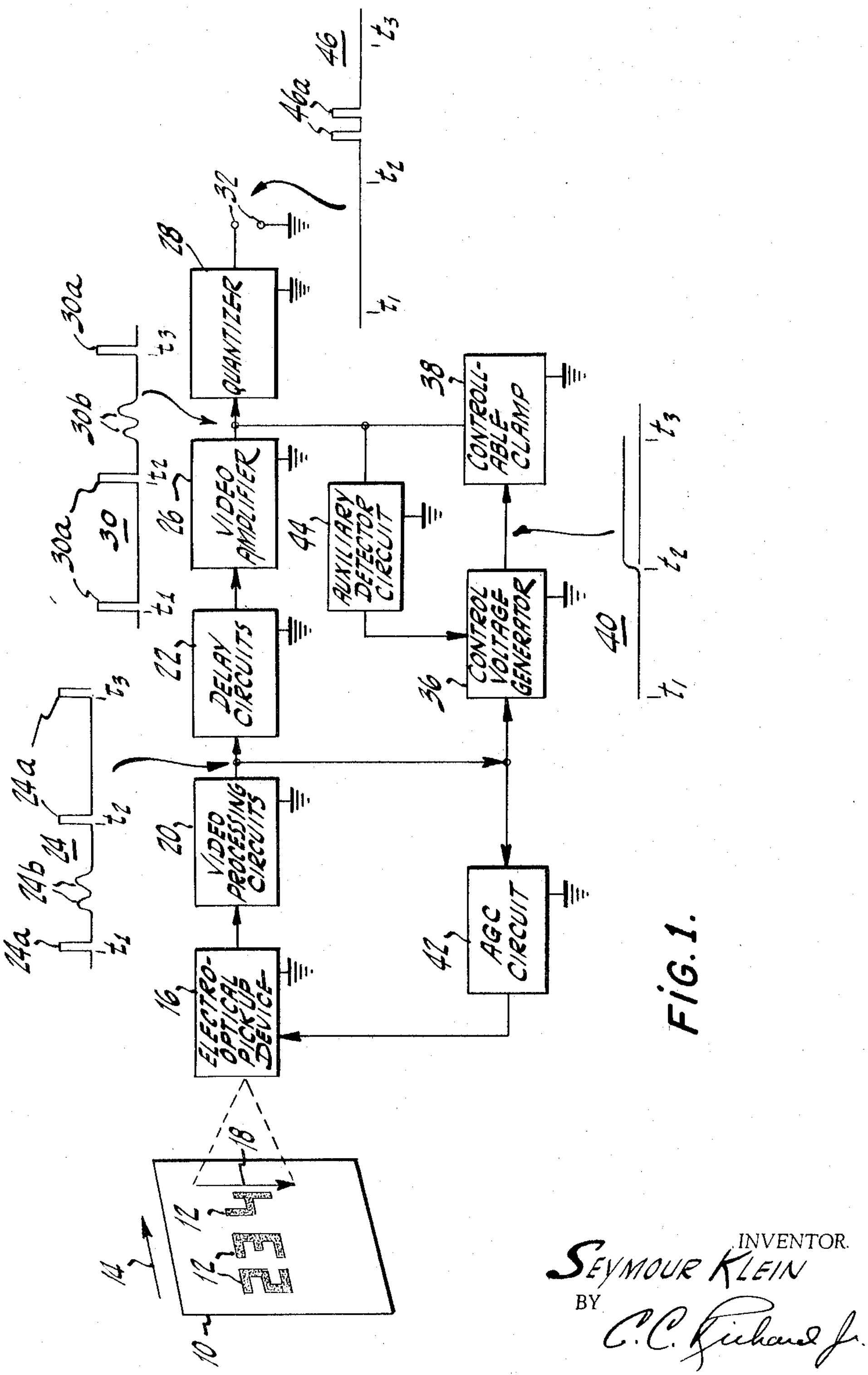
FIGURE 1 is a block diagram of the electro-optical scanning system for a character reader constructed in accordance with the invention.

FIGURE 1 is a block diagram of the major functions performed by the optical scanning system. A document 10, carrying characters 12 to be read, is moved in one direction (such as the horizontal direction indicated by the arrow 14) in front of an optical pick-up device 16. The optical pick-up device 16 is deflected to scan the characters in a direction perpendicular to the movement of the document 10 (such as the vertical direction indicated by the arrow 18 on the document 10). The characters may be scanned backwards or even upside down. The horizontal scanning is continuous, and the vertical scanning is a series of relatively slow scan lines from an initial position to a terminal position followed by a relatively rapid retrace of the device to its initial position. The device 16 is blanked during retrace so that no video output signals are obtained during this time. It will be appreciated that the horizontal scan need not be mechanical, but may be electrical as is the vertical scan.

Video signals, including image signals and blanking signals, derived from the electro-optical pick-up device 16 are applied through video processing circuits 20 to delay circuits 22. The video signals from the video processing circuit 20 are a series of scan lines. Two typical scan lines are illustrated as waveform 24 in FIGURE 1, that show a series of regularly spaced blanking pulses **24*a* occurring at the times marked $t_1$, $t_2$, and $t_3$. Image signals 24*b*** are shown occurring between the times $t_1$ and $t_2$, but for simplicity of explanation, no image signals are shown occurring between times $t_2$ and $t_3$.

The delay circuits 22 have a delay equal to one scan line interval including blanking time, that is, the time between $t_1$ and $t_2$ on the waveform 24. The delayed video signals from the delay circuits 22 are applied through a video amplifier 26 to a quantizer 28, the function of which will be explained hereinafter. Waveform 30 illustrates the delayed video signals at the output of the video amplifier 26, including the blanking pulses **30*a* and image signals 30*b*. The image signals 30*b* of waveform 30 correspond to the image signals 24*b* of waveform 24, but delayed by one scan line through the delay circuits 22**.

The output signal amplitude from the electro-optical pick-up device 16 may vary depending, for example, upon parameter changes of the device 16 itself, changes in illumination of the document 10, variations in the reflectivity of the document 10, or variations in the signal gain of the video processing circuits 20. In order to control the effect of such changes, the video signals from the video processing circuits 20 are applied to an AGC circuit 42 to generate a direct control voltage proportional to the peak-to-peak amplitude of the video signals (that is, the black-to-white amplitude of the signals corresponding to the amplitude of the blanking pulses) that is applied to the electro-optical pick-up device 16 to change its sensitivity and hold the peak-to-peak amplitude of the video signals from the video processing circuits 20 substantially constant.

The purpose of the quantizer 28 is to process the image signals (30*b* of waveform 30) and to provide, at output terminals 32, quantized video signals in the form of uniform amplitude pulses that have a duration equal to the duration of the image signals 30*b* at the level at which the image signals 30*b* are quantized. The image signals 30*b* are quantized at a fixed fraction or percentage of their maximum amplitude during a given scan line. A fixed level quantizer (that is, one that generates an output signal when the input signals thereto reaches a specific and fixed value) alone cannot perform this function, because the quantizer is to quantize the image signals during a line at the proper fraction or percentage whether the image signals are relatively high amplitude signals or relatively low amplitude signals.

Therefore, in order to insure that each line of image signals is quantized at substantially the same percentage despite variation in their amplitude from line-to-line, a control voltage for the quantizer 28 is developed simultaneously with the delay of the video signals through the delay circuits 22. To this end, a second output signal is taken from the video processing circuits 20 and applied to a control voltage generator 36 to generate a voltage proportional to the maximum amplitude of the image signals, exclusive of the blanking pulse, during the line. The control voltage is applied to a controllable clamp 38 to set the voltage level on the delay video signals (waveform 30) that will cause the quantizer 28 to operate so that each line of video signals is quantized at the proper fraction or percentage. The output control voltage from the control voltage generator 36 is shown as curve 40. Image signals 24*b* occurring between times $t_1$ and $t_2$ on the waveform 24 thus generate a control voltage that is applied between the times $t_2$ and $t_3$ to the controllable clamp 38, and the image signals 24*b* of waveform 24 from which the control voltage was developed, are also applied as the delayed image signals 30*b* of waveform 30 to the quantizer 28 during the time $t_2$ to $t_3$.

The signal gain through the delay circuits 22 and the video amplifier 26 may vary because of component aging and the like, and, in order to prevent such variation from affecting the quantizing action previously described, an auxiliary detector circuit 44 is connected to the output of the video amplifier 26 to generate a compensating voltage that is applied to the control voltage generator 36 to modify the control voltage (and, hence, the voltage level on the delayed video signals at which the quantizer 28 operates) in accordance therewith.

The resultant quantized video signals derived from the system (shown as waveform 46) are in the form of uniform amplitude pulses 46*a* having fast rise and fall times compared to the image signals from the electro-optical pick-up device 16. The quantized video signals from the quantizer 38, available at output terminals 32, may be applied, as is known, to further circuitry to recognize the character being scanned.

Figure 2:
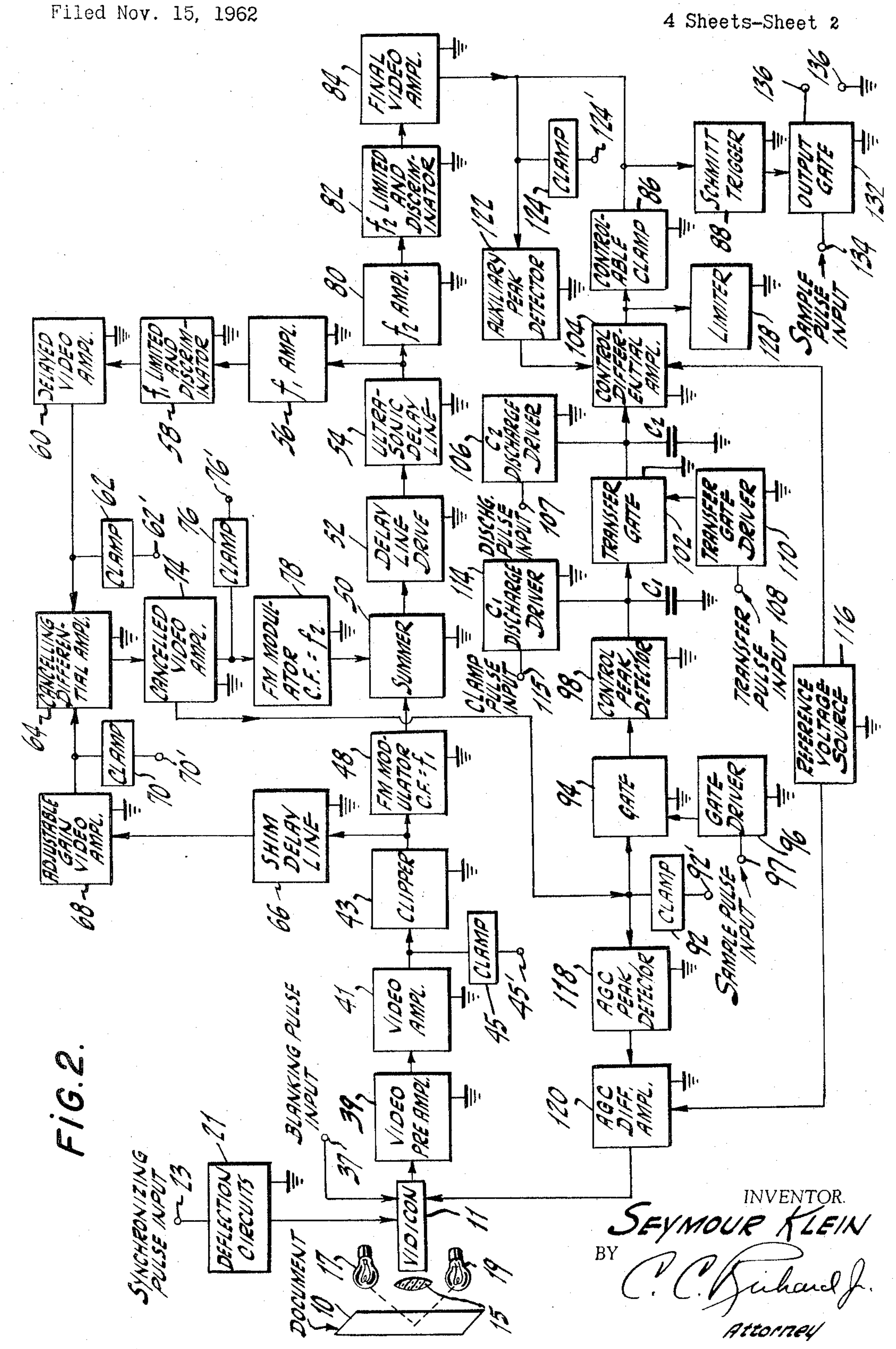
FIGURE 2 is a detailed block diagram of a specific embodiment of the electro-optical scanning system shown in FIGURE 1.

In the specific embodiment illustrated in FIGURE 2, the electro-optical device 16 of FIGURE 1, is a vidicon 11 having a photoconductive target (not shown). A document 10, carrying characters to be read, is transported in front of the target of the vidicon 11 by a document transport (not shown), and the characters to be read are individually imaged, in succession, on the target by an optical lens system, shown schematically as a single convex lens 15. Light is supplied to the document 10 by a pair of light sources 17, 19 spaced on either side of the vidicon 11. Two light sources are used to prevent, inter alia, the generation of shadows on the surface of the document which may be incorrectly read as characters. Any suitable document transport may be used such as a transport shown and desscribed in United States Patent 2,936,170, issued to W. W. Herrick et al., on May 10, 1960, and entitled "Document Feeding and Timing Device."

Each character to be read is scanned orthogonally, that is, in two perpendicular directions. This is accomplished by scanning the electron beam of the vidicon 11 across the image on its target in the vertical direction, while the document transport causes the document 10 to move in the horizontal direction. A raster is thus formed for each character scanned, with the vertical deflection of the vidicon 11 supplying one dimension of the raster, and the horizontal movement of the document 10 carrying the characters 12 supplying the horizontal dimension. In a particular example, the height of the characters 12 to be read is typically 0.1 inch and a character 12 is over-scanned by 2½ times, that is, the total height of the vertical scan is 0.25 inch, in order to take into account any vertical misregistration of characters 12. A single character 12 may be typically 0.07 inch wide, and is in the present arrangement scanned in fourteen vertical scans.

The vertical deflection of the vidicon 11 is provided by deflection circuits 21 using either electrostatic or electromagnetic deflection of the electron beam of the vidicon 11 in known types of deflection circuits. The vertical deflection is synchonized by synchonizing pulses applied to a synchronizing pulse input terminal 23 of the deflection circuit 21. The synchronizing pulses are shown as curve 25 of FIGURE 3. The synchronizing pulses 25 are generated by a timing generator (not shown) which also generates blanking pulses 27, sample pulses 29, discharge pulses 31, transfer pulses 33, and clamp pulses 35, all shown in FIGURE 3. These pulses are generated by known techniques and the particular timing and duration of the pulses is explained hereinafter in connection with the further description of the block diagram of FIGURE 2.

The blanking pulses 27 (FIGURE 3) are applied through a blanking pulse input terminal 37 to the cathode (not shown) of the vidicon 11 to cut off the electron beam of the vidicon 11 during retrace of the beam in a known manner. The blanking pulses 27 begin at the same time as the synchronizing pulses 25 but are longer in duration than the synchronizing pulses 25 to blank the electron beam during the entire retrace period, that is, the time required to return the electron beam to its initial starting position. As a particular example, the blanking pulse 27 is on the order of 6.6 microseconds and the interval between blanking pulses is on the order of 40 microseconds.

Video signals that are derived from the vidicon 11 include image signals representative of the character being scanned, in addition to regularly recurring blanking pulses. The image signals increase in amplitude toward the black level, that is, toward the peak amplitude of the blanking pulses 27, which level is full black. The larger the image signals, that is, the more contrast between the dark type of the character and the light paper on which the character is printed, the greater the peak amplitude of the image signals and the more their peaks approach the black level.

Figure 3:
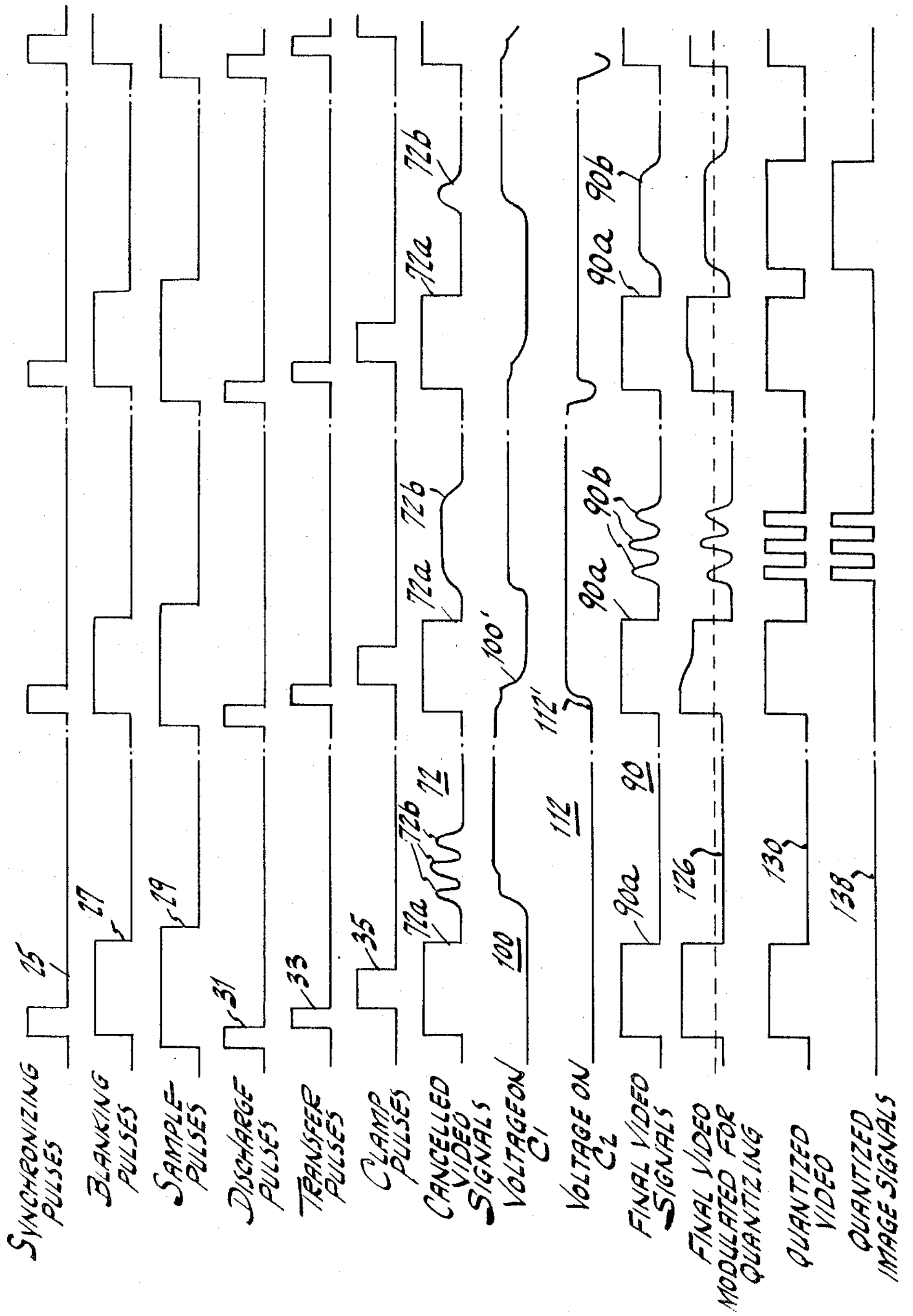
FIGURE 3 is a series of graphs showing curves representing signal waveforms occurring at the various points in the system of FIGURE 2.

The original video signals from the vidicon 11 are amplified through a video preamplifier 39 and a video amplifier 41, and applied through a clipper 43 to a first FM (frequency modulation) modulator 48 having a center frequency of $f_1$, which may be on the order of 35 mc.s. (megacycles per second). In this embodiment, the system is designed so that the peaks of the largest image signals normally obtainable from the vidicon 11 do not approach the black level set by the peak amplitude of the blanking pulses 27, and the excess blanking pulse 27 is clipped in the clipper 43 after the black level (or peak of the blanking pulse) is clamped to a fixed clamping level by a synchronous clamp 45. The clamp pulses 35, shown in FIGURE 3, are applied to an input terminal 45' of the synchronous clamp 45. The clamp pulses 35 are of less duration than the blanking pulses 27 and occur during the midpoint of the duration of the blanking pulses 27. Synchronous clamps are used at a number of points in the system and, unless otherwise specified, all clamps are operated by applying the clamp pulses 35 to their input terminals that carry primed reference numerals corresponding to the reference numerals of the clamp.

The purpose of clipping the video signals prior to their application to the first FM modulator 48 is to conserve the dynamic range of the modulator, because, as previously mentioned, the system is designed so that the amplitude of the image signals from the vidicon 11 never exceed a certain percentage of the blanking pulse amplitude.

The video signals cannot be used directly from the vidicon 11 to generate quantized signals representative of the characters. As is known, the vidicon 11 is subject to two types of lag—photoconductive lag and capacitive lag. Photoconductive lag (the failure of the photoconductive material of the target to respond instantaneously to the application and termination of light thereon) is a function of the material used for the target of the vidicon; and capacitive lag (the failure of the electron beam of the tube to instantaneously discharge each elemental area of the photoconductive target) is a function of the target capacitance, and the target resistance (that varies with the amount of light on the target), and the effective resistance of the electron beam of the vidicon. The total lag of the vidicon 11 may be reduced by increasing the amount of light incident on its photoconductive target. However, where a single line scan is used, as in the present system, the illumination cannot be increased sufficiently to reduce the lag to a negligible amount. The effect of lag may be reduced by subtracting from the video signals in one line, a portion of the video signals from the preceding line. Since the video signals from the next succeeding line contain information from the previous one line, the subtraction results in cancelled video signals which exhibit little effect of the vidicon lag and are acceptable for the purpose of character recognition.

The subtraction is accomplished by applying the output signals from the first FM modulator 48, which signal has a center frequency equal to $f_1$ and is frequency modulated with the clipped video signals, through a balun or summer (adder) 50 (that adds together two signals applied to it), and a delay line driver 52 to an ultrasonic delay line 54 that has a time delay exactly equal to one scan line, including the blanking interval, of the vidicon 11. The output signal from the ultrasonic delay line 54 is applied through an $f_1$ amplifier 56 to an $f_1$ limiter and discriminator 58 which demodulates the $f_1$ wave to derive the now delayed video signals; and applies them through a delayed video amplifier 60 across a synchronous clamp 62, as one input signal to a cancelling differential amplifier 64. Note that the video signals thus applied to the cancelling differential amplifier 64 have been once delayed through the ultrasonic delay line 54. Video signals from the next succeeding line are applied, as they are generated by the vidicon 11, from the output of the clipper 43 as the second input signal to the cancelling differential amplifier 64 through a shim delay line 66 (to compensate for any delay of the once delayed video signals occasioned by other than the ultrasonic delay line 54), and an adjustable gain video amplifier 68 across a synchronous clamp 70. A portion of the delayed video signals is subtracted from the direct video signals in the cancelling differential amplifier 64, and the resultant cancelled video signals are, as previously noted, substantially free of the lag effects of the vidicon 11.

In the embodiment of FIGURE 1 the delay circuits are only used once, thus it was not necessary to modulate the video signals on a carrier. But in the embodiment of FIGURE 2, the delay is to be used twice, once for vidicon lag compensation and once for the generation of the control voltage, as explained in connection with FIGURE 1. It is thus necessary to modulate the video signals on different frequency carriers so that the once delayed video signals may be separated from the twice delayed video signals.

In order to maintain the peak-to-peak amplitude of the cancelled video signals from the cancelled video signal amplifier 74 substantially constant, a second output is derived from the cancelled video amplifier 74 and applied across a synchronous clamp 92 to an AGC peak detector 118 to develop a direct voltage equal to the peak-to-peak amplitude of the cancelled video signals, including the blanking pulses. This direct voltage is applied to an AGC differential amplifier 120 as one input thereto. A second input to the AGC differential amplifier 120 is derived from a source of reference voltage 116. The output signal from the AGC differential amplifier 120 (which corresponds to the output signal from the AGC circuit 42 of FIGURE 1) is applied to the control grid (not shown) of the vidicon 11 to control its sensitivity to maintain the output signal from the cancelled video output signal 74 substantially constant. The cancelled video signals from the cancelling differential amplifier 64 are shown as curve 72 of FIGURE 3, having blanking pulses 72*a* and image signals 72*b*.

The cancelled video signals are now processed in the manner described in connection with FIGURE 1. Specifically, the cancelled video signals are applied through a cancelled video amplifier 74 and across a synchronous clamp 76 to a second FM modulator 78 having a center frequency equal to $f_2$, that may be on the order to 51 megacycles. The frequency modulated wave $f_2$ is applied through the summer 50 and the delay line driver 52 to the ultrasonic delay line 54 where it is delayed again for another line interval. The output signal from the ultrasonic delay line 54 at the frequency $f_2$ is applied through an $f_2$ amplifier 80 to an $f_2$ limiter and discriminator 82 where the now twice delayed cancelled video signals (or final video signals) are detected. The final video signals are shown as curve 90 in FIGURE 2, having blanking pulses 90*a* and image signals 90*b*. Note that the image signals 90*b* are delayed by one scan line from the image signals 72*b* of the cancelled video signals 72. The final video signals are applied through a final video amplifier 84 and across a controllable clamp 86 (corresponding to the controllable clamp 38 of FIGURE 1) to the input circuit of a Schmitt trigger 88 that ultimately quantizes the final video signals, as is explained in greater detail hereinafter.

The image signals of the final video signals do not have fast rise and fall times nor equal amplitudes, and are to be converted to uniform amplitude pulses with relatively fast rise and fall time by the Schmitt trigger 88. In order that the quantized image signals derived from the Schmitt trigger 88 are representative of the character information desired, the image signals are quantized at a fixed percentage of the maximum amplitude of the image signals themselves during a line, and not of the total peak-to-peak blanking pulse amplitude of the video signals, as previously explained. Briefly, however, the reason for this is that the peak-to-peak amplitude of the video signals including the blanking pulse is maintained at a substantially fixed amplitude by the AGC circuitry (118, 120) hereinbefore described; while the amplitude of the image signals, between blanking pulses, is subject to amplitude variations because it is dependent upon the intensity of the characters being scanned with relation to the reflectivity of the document on which the character is printed.

In order to insure that the Schmitt trigger 88 quantizes the image signals at the proper percentage, the final video signals from the final video amplifier 84 are applied to the Schmitt trigger 88 across the controllable clamp 86, and a control voltage responsive to the peak amplitude of the image signals during the line to be quantized is applied to the controllable clamp 86 to fix its clamping level. To generate this control voltage a second output from the cancelled video amplifier 74 is applied across a synchronous clamp 92 to a gate 94. A gate driver 96 controls the gate 94 and is driven by the sample pulses 29, which are applied to its input terminal 97, as shown in FIGURE 3. The sample pulse 29 begins prior to the synchronizing and blanking pulses 25, 27, and ends subsequent to those pulses. The purpose of the gate 94 and gate driver 96 is to gate the blanking pulses **72*a* from the cancelled video signal 72. The output of the gate 94 is thus the cancelled video signals less the blanking pulses (that is, it includes only the image signals), and is applied to a control peak detector 98 to derive a direct voltage proportional to the highest amplitude of the image signals during the line. This direct voltage is developed across $C_1$. This action is shown by curve 100 in FIGURE 3. Note that the voltage on $C_1$ is stored until the end of the scan line, and that the image signals of the cancelled video signals (represented by the voltage across $C_1$) are delayed during this line through the ultrasonic delay line before they are applied to the Schmitt trigger 88. Thus, at the same time as the cancelled video signals are being delayed in the ultrasonic delay line 54** the control voltage is being generated across $C_1$.

The control voltage across $C_1$ is eventually transferred through a transfer gate 102 to the capacitor $C_2$ and from the capacitor $C_2$ to a control differential amplifier 104. The control differential amplifier 104 generates the final control voltage to apply to the controllable clamp 86.

In order to effect the transfer of the voltage on $C_1$ through the circuit previously described to the controllable clamp 86, the discharge pulses 31, the transfer pulses 33 and the clamp pulses 35 shown in FIGURE 3 are utilized. The discharge pulses 31 occur first and begin simultaneously with the sample pulses 29. The discharge pulses 31 are applied through a $C_2$ discharge driver 106 at its input terminal 107 to the capacitor $C_2$ in order to discharge any previous voltage that may have existed across the capacitor $C_2$. At the termination of the discharge pulses 31, the transfer pulses 33 occur and are applied through a transfer pulse input terminal 108 to a transfer gate driver 110 for the transfer gate 102. During the occurrence of the transfer pulses 33, the voltage on the capacitor $C_1$ is transferred across to the capacitor $C_2$. This action is shown on curve 112 of FIGURE 3, and illustrates that during a single transfer of the voltage from $C_1$ to $C_2$, occurring during the transfer pulse 33 and shown as the transfer region 112' of curve 112, the voltage on $C_1$ is slightly discharged. At the termination of the transfer pulse 33 a clamp pulse 35 occurs, and is applied through a $C_1$ discharge driver 114 at its input terminal 115 to completely discharge the capacitor $C_1$. Note on curve 100 that the complete discharge of the capacitor $C_1$ occurs during the clamp pulse 35 and is shown as the discharge period 100' of curve 100.

The result of the operation previously described is that there is applied to the control differential amplifier 104, at one input thereto, the voltage across $C_2$, representative of the peak amplitude of the image signals in the next line to be quantized by the Schmitt trigger 88. The second input to the control differential amplifier 104 is derived from the reference voltage source 116. The purpose of using the reference voltage is to compare the peak amplitude of the video during the next line to be quantized with an absolute reference level. The function performed by the control differential amplifier 104 is to set the clamp level of the controllable clamp 86 such that the final video signals applied to the Schmitt trigger 88 are quantized at the proper quantizing fraction or percentage in accordance with the reference level.

The AGC peak detector 118 and its associated circuitry maintains the amplitude of the cancelled video signals substantially constant with respect to the reference voltage source 116, as previously explained, so that the proper clamping level may be set on the controllable clamp 86 for each line of final video signals that are quantized by the Schmitt trigger 88. However, the setting of the clamping level of the controllable clamp 86 is based on the assumption that the peak-to-peak amplitude of the final video signals applied to the Schmitt trigger 88 remain constant. A change in gain between the cancelled video amplifier 74 and the Schmitt trigger 88 would render the controllable clamp setting incorrect, even though the amplitude of the cancelled video signals at the output of the cancelled video amplifier 74 are maintained constant. In order to compensate for any such gain changes, an auxiliary peak detector 122 is connected across a synchronous clamp 124 to the output of the final video amplifier 84 to derive a direct voltage proportional to the peak-to-peak amplitude of the final video signals, including the blanking pulse. This direct voltage is applied to the control differential amplifier 104 to vary the value of its control voltage output in accordance with the peak-to-peak amplitude of the final video signals applied to the Schmitt trigger 88.

The result of the control functions on the controllable clamp 86 is to modulate the final video signals applied to the Schmitt trigger 88 so that the image signals in each line are quantized at the correct quantizing fraction or percentage desired. The modulated final video signals are shown as curve 126. Note that the level of the blanking pulse of curve 126 is changed beginning with the initiation of the clamp pulse 35 responsive to the peak amplitude of the image signals to be quantized during the next succeeding line.

The function of the control differential amplifier 104 may be expressed in equation form as:

$$V_c=(V_1-MV_2)f$$

where, $V_c$ is the output control voltage from the control differential amplifier 104 to set the clamping level of the controllable clamp for the duration of a single scan line;

$V_1$ is the peak-to-peak voltage of the blanking-to-white level of the cancelled video signal from the cancelled video amplifier 74;

$V_2$ is the actual amplitude of the highest image signals during the scan line, excluding the blanking pulses, of the cancelled video signal at the output of the cancelled video amplifier 74;

M is the quantizing fraction or percentage; and $f$ is the ratio of the peak-to-peak blanking-to-white level voltage value of the final video signal at the input to the Schmitt trigger 88 to the voltage value of $V_1$.

The equation states in mathematical terms that the control voltage applied from the control differential amplifier 104 to the controllable clamp 86 varies with the amplitude of the image signals of the final video signals being quantized. The result is that each line of the video signals is quantized at the same fraction or percentage despite the fact that the absolute amplitude of the image signals may vary from a small percentage of the blanking pulse amplitude to a large percentage of the blanking pulse amplitude from line-to-line.

If the image signals become small, that is, comparable to noise signals in the system, the Schmitt trigger 88 is prevented from quantizing any signals because it cannot distinguish between image signals and noise signals. A limiter 128 is connected to the output of the control differential amplifier 104 for this purpose—to prevent the output control signals from going beyond a value at which useful output signals may be obtained from the Schmitt trigger 88.

The operation of the Schmitt trigger 88 is well known. Briefly, however, any signal applied thereto that exceeds its triggering level causes an output signal, of constant amplitude, to be developed. When the signal applied to the Schmitt trigger 88 falls below the triggering level, the output pulse from it ceases. The output signal from the Schmitt trigger 88 is thus pulses of constant amplitude and having a duration corresponding to the duration of the blanking pulse and image signals at the level of the signals corresponding to the quantizing percentage or fraction as shown in curve 130 of FIGURE 2.

The output signals from the Schmitt trigger 88 are applied to an output gate circuit 132 that is driven by the sample pulse 29 applied to its input terminal 134. The output gate circuit 132 gates the quantized blanking pulse out of the output of the Schmitt trigger 88 and applies the resultant quantized image signals to the output terminals 136 of the system. The quantized image signals are shown as curve 138 of FIGURE 2.

Figure 4:
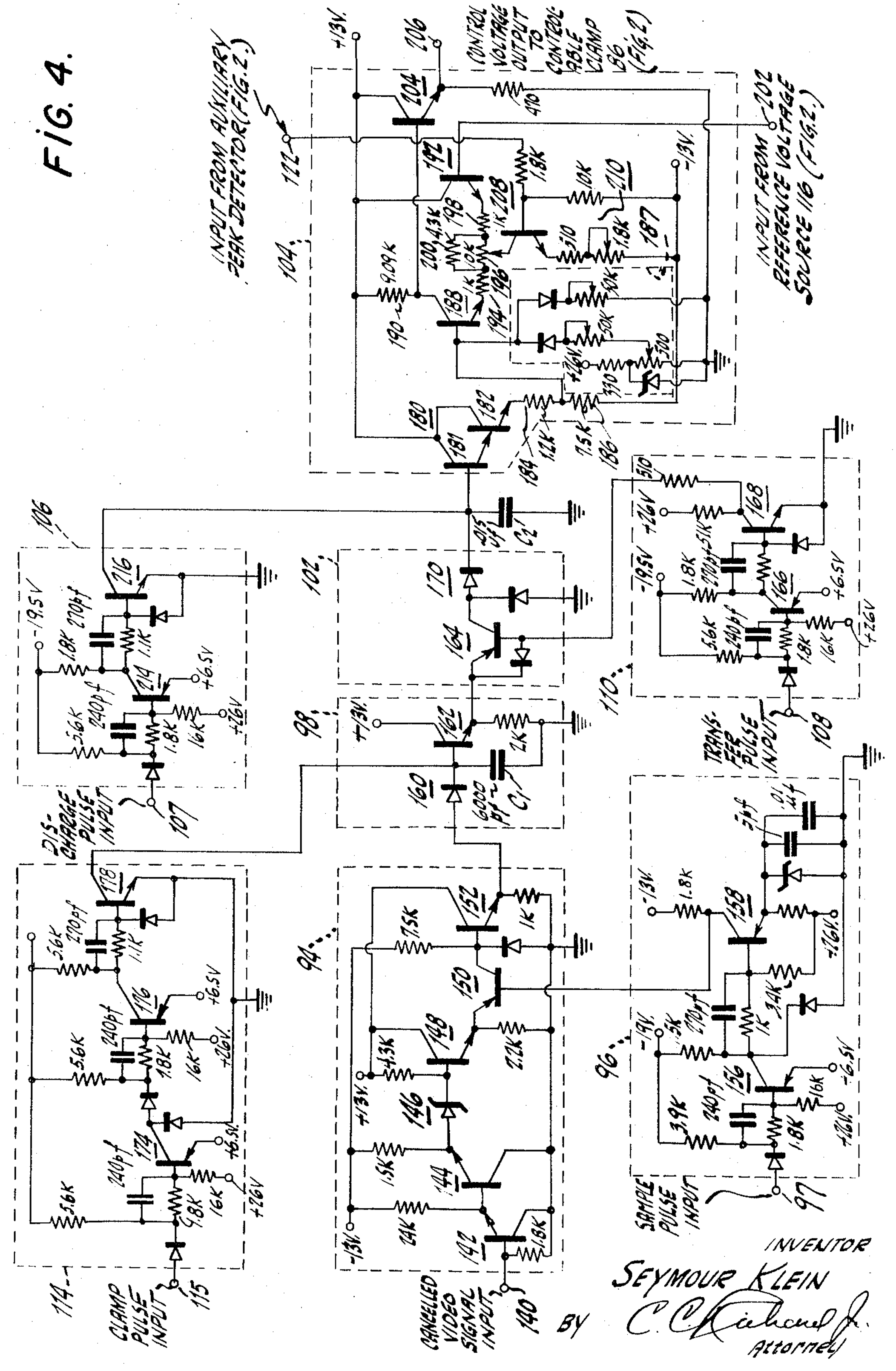
FIGURE 4 is a detailed schematic circuit diagram of a portion of the system shown in FIGURE 2.

All of the functions performed in the system of FIGURE 2 may be performed by well known circuits; however, circuitry is shown in FIGURE 4 to generate the control voltage for the controllable clamp 86 of FIGURE 2. Specifically, FIGURE 4 shows transistor circuitry, including component values, for the gate 94 and gate driver 96, the control peak detector 98, the capacitor $C_1$ and the $C_1$ discharge driver 114, the transfer gate 102 and the transfer gate driver 110, the capacitor $C_2$ and the $C_2$ discharge driver 106, and the control differential amplifier 104.

Cancelled video signals from the cancelled video amplifier 74 of FIGURE 2 are positive-going, that is, the blanking pulses and image signals extend in a positive voltage direction from a baseline, and are applied to an input terminal 140 of the gate circuit 94 of FIGURE 4. The cancelled video signals are coupled from the input terminal 140 through a pair of direct-coupled, transistor emitter-follower circuits 142, 144 (using NPN transistors), a zener diode 146, and a third transistor (NPN) emitter-follower circuit 148 to the emitter of a first gate transistor 150 (using a PNP transistor). The first gate transistor 150 is normally conducting and the positive-going cancelled video signals normally pass therethrough to an output transistor (NPN) emitter-follower 152 for the gate 94.

Positive going sample pulses 29, shown in FIGURE 3, drive the gate driver circuit, as described in connection with FIGURE 2, and are applied thereto through its input terminal 97. The gate driver circuit 96 includes a pair of transistor (NPN) trigger circuits 156, 158, and positive going pulses, responsive to the sample pulses 29, are applied from the collector of the transistor in the second trigger circuit 158 directly to the base electrode of the gate transistor 150 in the gate circuit 94. The pulses turn-off the first gate transistor 150 during occurrence of the sample pulses 29, and pevent signal flow therethrough. The sample pulses 29 overlap the blanking pulses of the cancelled video signals, as shown in FIGURE 3, and thus prevent the transmission of the blanking pulse portion of the cancelled video signals through the gate circuit 94.

The positive-going cancelled video signals from the gate circuit 94, without blanking pulses, are applied from the output emitter-follower 152 directly to the anode of a diode 160 in the control peak detector circuit 98, and a direct voltage (positive with respect to ground) is developed across the capacitor $C_1$, connected between the cathode of the diode 160 and ground for the system. The direct voltage is proportional to the maximum amplitude of the image signals during the line of cancelled video signals being processed. The direct voltage across the capacitor $C_1$ is applied through a transistor (NPN) emitter-follower 162 to the emitter of a second gate transistor 164 (using a PNP transistor) in the transfer gate 102. The second gate transistor 164 is normally non-conducting and does not pass signals.

The transfer gate 102 is driven by applying positive-going transfer pulses 33, shown in FIGURE 3, to the input terminal 108 of the transfer gate driver 110. The transfer gate driver 110 includes a pair of cascaded transistor trigger circuits 166, 168 (PNP and NPN transistors, respectively) and develops negative-going pulses at the collector electrode of the transistor in the trigger circuit 168, that are applied through a resistor to the base electrode of the second gate transistor 164, to drive it into conduction. The conduction of the second gate transistor 164 causes the direct voltage across capacitor $C_1$ to be applied through the emitter follower 162, the second gate transistor 164, and a diode 170, directly across the capacitor $C_2$.

At the expiration of the transfer pulses 33, the clamp pulses 35, shown in FIGURE 3, occur, and are applied to the input terminal 115 of the $C_1$ discharge driver 114. The $C_1$ discharge driver includes three cascaded transistor trigger circuits 174, 176, 178, the first two of which use PNP transistors and the final one an NPN transistor. A negative-going output pulse corresponding to the clamp pulse 35 is avilable from the final trigger circuit 178 and is applied directly to the capacitor $C_1$ in the control peak detector 98 to discharge the voltage across the capacitor $C_1$.

The direct voltage transferred from the capacitor $C_1$ to $C_2$ is applied to an emitter follower circuit 180 in the control differential amplifier 104. The emitter follower 180 circuit utilizes a pair of NPN transistors 181 and 182 having their collector electrodes connected together and the emitter electrode of the transistor 181 connected to the base electrode of the transistor 182. The load impedance of the emitter follower 180 consists of a pair of resistors 184, 186 connected in series to the emitter of transistor 182. The voltage of $C_2$ appears across the resistors 184, 186, and a portion is applied to the base electrode of a first differential amplifier transistor (NPN) 188 from the junction of the two resistors. A standard gamma correction circuit 187 is connected to the base electrode of the first differential amplifier transistor 104 that has the effect of increasing the quantizing fraction on extremely heavy printing. Heavy printing may be accompanied by ink splatters and the increasing in the quantizing fraction prevents these splatters from being quantized as signals.

A load resistor 190 is connected in the collector of the first differential amplifier transistor 188 and its emitter is connected through a resistor network directly to the emitter electrode of a second differential amplifier transistor (NPN) 192. The resistor network includes a first resistor 194, a potentiometer 196, having a variable tap, and a second resistor 198 connected in series, with a fourth resistor 200 shunted across the potentiometer 196. A reference voltage (from the reference voltage source 116 in FIGURE 2) is applied directly to the base of the second differential amplifier transistor 192 through a reference voltage input terminal 202. The output of the differential amplifier transistor 188, is a direct voltage that is a measure of the difference between the voltage of the reference voltage source and the voltage across the capacitor $C_2$. This direct voltage is the control voltage output voltage and is applied from the collector of the first differential amplifier transistor 188 through a transistor (NPN) emitter follower 204 to the output terminal 206 of the control differential amplifier 104. This control voltage is applied, as previously described, to the controllable clamp 86.

In order to modify the gain of the control differential amplifier 104 in accordance with the amplitude of the final video signals, as described in connection with FIGURES 1 and 2, the output voltage from the auxiliary peak detector 122 (FIGURES 1 and 2) is applied to the base electrode of a control transistor (NPN) 208, that has its collector electrode connected to the variable tap of the potentiometer 196 and its emitter electrode connected to an emitter load circuit 210. Variation of the voltage on the base of the control transistor 208 varies its impedance and thus varies the gain of the differential amplifier transistors 188 and 192 to vary the output control voltage at terminal 206 in accordance with the amplitude of the final video signals, as previously explained in connection with FIGURES 1 and 2.

The control voltage at the output terminal 206 of the differential amplifier maintains its value until a discharge pulse 31 occurs. The discharge pulse 31 is applied to the input terminal 107 of the discharge driver circuit 106. The discharge circuit 106 includes a pair of cascaded trigger circuits 214, 216 the first of which uses an NPN transistor and the second a PNP transistor. A negative-going output signal corresponding to the discharge pulse 31 is thus available from the trigger circuit 216 and is applied directly to the capacitor $C_2$ to discharge the voltage thereacross. At the termination of the discharge pulse 31, the cycle repeats itself.

What is claimed is:

1. A system for generating a series of uniform amplitude pulse signals representing printed alpha-numeric characters on a document, comprising, in combination:
   - a source of first image signals in a series of scan lines representative of successive scans of the characters on said document, said signals being subject to variations in amplitude from scan line to scan line;
   - means for delaying said first image signals for a period equal to the period of said scan lines to generate delayed image signals;
   - control voltage generating means for generating a control voltage responsive to the maximum amplitude of said first image signals during a scan line;
   - circuit means responsive to said delayed image signals for generating uniform amplitude square pulses corresponding to said delayed image signals applied thereto and having a time duration equal to the time duration of said delayed image signals that exceed a triggering level on said signals; and
   - means responsive to said control voltage for varying said triggering level on said delayed image signals so that the uniform amplitude pulse signals generated by said circuit means have a duration equal to the duration of said delayed image signals at a fixed fraction of their maximum amplitude during each scan line despite variations in the maximum amplitude of said delayed image signals from scan line to scan line.

2. A system for generating a series of uniform amplitude pulse signals representing printed alpha-numeric characters on a document, comprising, in combination:
   - electro-optical means for successively scanning the characters on said document in a series of spaced scan lines to generate image signals representing said characters, said signals varying in amplitude in accordance with the variation in intensity of the printed characters on said document;
   - means for delaying said image signals for a period equal to the period of said scan lines to generate delayed image signals;
   - control voltage generating means responsive to said image signals for generating a control voltage in accordance with the maximum amplitude of said image signals during a scan line;
   - quantizing circuit means for generating uniform amplitude square pulses corresponding to signals applied thereto, said pulses having a time duration equal to the time during which said signals exceed a triggering level;
   - means for applying said delayed image signals to said quantizing circuit means; and
   - means responsive to said control voltage for establishing a separate triggering level for each scan line of said delayed image signals so that the uniform amplitude pulse signals generated by said quantizing circuit means have a duration equal to the duration of said delayed image signals at a fixed fraction of their maximum amplitude during each scan line despite variations in the maximum amplitude of said delayed image signals from scan line to scan line.

3. A system for generating a series of uniform pulse signals representing printed alpha-numeric characters on a document, comprising, in combination:
   - electro-optical means for successively scanning the characters on said document in a series of spaced scan lines to generate image signals representing said characters, said signals varying in amplitude from scan line-to-scan line in accordance with the variation in intensity of the printed characters on said document;
   - delay means having a delay equal to the period of said scan lines;
   - means for applying said image signals to said delay means;
   - means for deriving delayed image signals from said delay means;
   - control voltage generating means for generating a control voltage responsive to the maximum amplitude of image signals applied thereto during a scan line;
   - means for applying image signals from said electro-optical means, without substantial delay, to said control voltage generating means;
   - means for deriving a control voltage from said control voltage generating means;
   - quantizing circuit means for generating uniform amplitude square pulses corresponding to signals applied thereto and having a time duration equal to the time that said applied signals exceed a triggering level;
   - means for applying said delayed image signals to said quantizing circuit means; and
   - means responsive to said control voltage for establishing a separate triggering level on said delayed image signals for each scan line so that the uniform amplitude pulse signals generated by said quantizing circuit means have a duration equal to the duration of said delayed image signals at a fixed fraction of their maximum amplitude during each scan line despite variations in the maximum amplitude of said delayed image signals from scan line to scan line.

4. A system for generating a series of uniform amplitude pulse signals representing printed alpha-numeric characters on a document, comprising, in combination:
   - electro-optical means for successively scanning the characters on said document in a series of spaced scan lines to generate video signals representing said characters, said video signals having relatively constant amplitude blanking pulses between successive scans, and image signals between said blanking pulses, said image signals varying in amplitude in accordance with the variation in intensity of the printed characters on the document;
   - delay means having a delay equal to the period of one of said scan lines;
   - means for applying said video signals to said delay means;
   - means for deriving delayed video signals from said delay means;
   - control voltage generating means for generating a control voltage responsive to the maximum amplitude of signals applied thereto during a scan line;
   - means for applying the image signals of said video signals from said electro-optical means, without substantial delay, to said control voltage generating means;
   - means for deriving a control voltage from said control voltage generating means;
   - quantizing circuit means having an input circuit for generating uniform amplitude square pulses corresponding to signals applied to said input circuit and having a time duration equal to the time that said signals exceed a triggering level;
   - means for applying said delayed video signals to the input circuit of said quantizing circuit means;
   - a controllable clamp circuit connected to the input circuit of said quantizing circuit means for clamping the blanking pulses of said delayed video signals at a clamping level; and means for applying said control voltage to said controllable clamp circuit for varying said clamping level so that the image signals of said delayed video signals exceed said triggering level by a fixed fraction of their maximum amplitude during each scan line despite variations in the maximum amplitude of said image signals from scan line to scan line.

5. A system for generating a series of uniform amplitude pulse signals representing printed alpha-numeric characters on a document, comprising, in combination:

electro-optical means for successively scanning the characters on said document in a series on spaced scan lines to generate first video signals representing said characters, said first video signals having relatively constant amplitude blanking pulses between successive scans and image signals between said blanking pulses, said image signals varying in amplitude in accordance with the variation in intensity of the printed characters on the document;

means for delaying said first video signals by a period equal to the period of said scan lines to generate delayed video signals;

control voltage generating means for generating a control voltage responsive to the maximum amplitude of the image signals of the first video signals in a scan line;

quantizing circuit means having an input circuit for generating uniform amplitude square pulses corresponding to signals applied to said input circuit, said pulses having a time duration equal to the time that said signals exceed a fixed input voltage;

means for applying said delayed video signals to the input circuit of said quantizing circuit means;

controllable clamp means connected to the input circuit of said quantizing circuit means for clamping the blanking pulses of said delayed video signals at a clamping level; and means for applying said control voltage to said controllable clamp means for varying said clamping level so that the image signals of said delayed video signals exceed said fixed input voltage in the input circuit of said quantizing circuit means by a fixed fraction of their maximum amplitude during each scan line despite variations in the maximum amplitude of said image signals from scan line to scan line.

6. In a system for generating a series of uniform amplitude pulse signals representing printed alpha-numeric characters on a document, the combination comprising:

a source of first video signals representing said characters in a series of scan lines, said video signals including image signals that may vary in amplitude;

means for delaying said first video signals for a period equal to the period of said scan lines to generate delayed video signals;

control voltage generating means for generating a control voltage responsive to the maximum amplitude of the image signals of said first video signals during a scan line;

quantizing circuit means having an input circuit for generating uniform amplitude square pulses corresponding to signals applied to said input circuit and having a time duration equal to the time that said signals exceed a triggering level;

means for applying said delayed video signals to the input circuit of said quantizing circuit means; and means responsive to said control voltage for varying the triggering level of said video signals so that said image signals thereof exceed said level by a fixed fraction of their maximum amplitude during each scan line despite variations in the maximum amplitude of said image signal from scan line to scan line.

7. An electro-optical scanning system for generating electrical signals representative of printed alpha-numeric characters on a document comprising, in combination:

an electro-optical device for converting light signals thereon into electrical signals;

an optical lens system for imaging light emanating from said document onto said device;

means for transporting the document carrying said characters past said device in one direction at a constant velocity;

means for scanning said device across the image thereon in a direction perpendicular to said one direction in a series of scan lines having a relatively slow scan from an initial position to a terminal position and a relatively rapid retrace from the terminal position to the initial position;

means for deriving first video signals from said device in a series of scan lines, each of said scan lines including a constant amplitude blanking pulse occuring during retrace time, and image signals, that may vary in amplitude, occurring during scan time, each character of said document being represented by a plurality of said scan lines;

delay means for delaying said video signals for a period equal to the period of said scan lines for deriving delayed video signals;

control means responsive to the amplitude of the image signals of said first video signals for generating a control voltage proportional to the maximum amplitude of the image signals occurring during a scan line;

quantizing circuit means, having an input circuit, for generating constant amplitude square pulses on input signals in said input circuit exceeding a triggering level, said pulses having a duration equal to the time that said input signals exceed said triggering level;

means for applying said delayed video signals to the input circuit of said quantizing circuit means;

controllable clamp means connected to the input circuit of said quantizing means for clamping said blanking pulses of said video signals at a clamping level; and means for applying said control voltage to said controllable clamp means to vary said clamping level from scan line to scan line so that the image signals of each scan line of delayed video signals exceed said triggering level of said quantizing circuit means by a fixed percentage of the maximum amplitude of the image signals during the scan line despite variations in the maximum amplitude of image signals from scan line to scan line.

8. An electro-optical scanning system for generating electrical signals representative of printed alpha-numeric characters on a document comprising, in combination:

an electro-optical device for converting light signals thereon into electrical signals;

scanning means for said device to scan the characters on said document in a series of orthogonal scan lines;

means for deriving original video signals from said device in a series of scan lines, including regularly recurring, constant amplitude blanking pulses and image signals, said image signals being subject to variations in amplitude from scan line to scan line;

delay means for delaying said video signals for a period equal to the period of said scan lines for deriving delayed video signals;

control means responsive to the amplitude of the image signals of said original video signals for generating a control voltage proportional to the maximum amplitude of the image signals occurring during a scan line;

quantizing circuit means having an input circuit for generating constant amplitude square pulses on input signals in said input circuit exceeding a triggering level, said pulses having a duration equal to the time during which said input signals exceed said triggering level;

means for applying said delayed video signals to the input circuit of said quantizing circuit means;

controllable clamp means connected to the input circuit of said quantizing means for clamping said blanking pulses of said video signals at a clamping level; and means for applying said control voltage to said controllable clamp means to vary said clamping level from scan line to scan line so that the image signals of each scan line of video signals exceeds said triggering level of said quantizing circuit means by a fixed percentage of the maximum amplitude of the image signals during the scan line, despite variations in the maximum amplitude of image signals from scan line to scan line.

9. An electric-optical scanning system for generating electrical signals representative of printed alpha-numeric characters on a document comprising, in combination:

electro-optical means for scanning said characters to derive first video signals in a series of scan lines representative of said characters, said scan lines including regularly recurring, constant amplitude blanking pulses and image signals, said image signals being subject to variations in amplitude from scan line to scan line;

delay means for delaying said first video signals for a period equal to the period of said scan lines for deriving delayed video signals;

control means responsive to the amplitude of the image signals of said first video signals for generating a control voltage proportional to the maximum amplitude of the image signals occurring during a scan line;

quantizing circuit means having an input circuit for generating constant amplitude square pulses on input signals in said input circuit exceeding a fixed triggering level, said pulses having a duration equal to the time during which said input signals exceed said triggering level;

means for applying said delayed video signals to the input circuit of said quantizing circuit means;

controllable clamp means connected to the input circuit of said quantizing means for clamping said blanking pulses of said video signals at a clamping level; and means for applying said control voltage to said controllable clamp means to vary said clamping level from scan line to scan line so that the image signals of each scan line of video signals exceeds said triggering level of said quantizing circuit means by a fixed percentage of the maximum amplitude of the image signals during the scan line being quantized, despite variations in the maximum amplitude of image signals from scan line to scan line.

10. An electro-optical scanning system for generating electrical signals representative of printed alpha-numeric characters on a document comprising, in combination:

electro-optical means for scanning said characters to derive first video signals in a series of scan lines representative of said characters, each of said scan lines including image signals, said image signals being subject to amplitude variations;

delay means for delaying said first video signals for a period equal to the period of said scan lines for deriving delayed video signals;

control means responsive to the amplitude of the image signals of said first video signals for generating a control voltage proportional to the maximum amplitude of the image signals occuring during a scan line;

quantizing circuit means responsive to said delayed video signals for generating constant amplitude square pulses when the amplitude of said video signals exceed a triggering level, said pulses having a duration equal to the time during which said signals exceed said triggering level; and further means responsive to said control voltage to vary said triggering level of said delayed video signals from scan line to scan line so that the image signals of each scan line of video signals exceeds said triggering level of said quantizing circuit means by a fixed percentage of maximum amplitude of the image signals during the scan line, despite variations in the maximum amplitude of image signals from scan line to scan line.

11. In an electro-optical scanning system for generating electrical signals representative of printed alphanumeric characters on a document, the combination comprising:

a source of image signals in a series of scan lines representative of said characters, said image signals being subject to amplitude variations;

means for delaying said image signals for a period equal to the period of said scan lines to derive delayed image signals;

control means responsive to the amplitude of said original image signals for generating a control voltage proportional to the maximum amplitude of the original image signals occurring during a scan line;

quantizing circuit means responsive to said delayed image signals for generating constant amplitude square pulses during the time the amplitude of said image signals exceed a triggering level; and means responsive to said control voltage to vary said triggering level from scan line to scan line so that the image signals of each scan line exceeds said triggering level of said quantizing circuit means by a fixed percentage of maximum amplitude of the image signals during the scan line, despite variations in the maximum amplitude of image signals from scan line to scan line.

12. In a system for generating uniform amplitude electrical signals representing printed alpha-numeric characters on a document, the combination comprising:

electro-optical means for successively scanning each character on said document in a series of scan lines to generate electrical image signals, said signals may vary in amplitude in accordance with variations in intensity of the printed character on the document;

quantizing means having an input circuit and having a first output voltage responsive to signals in said input circuit below a triggering voltage amplitude, and having a second output voltage responsive to signals in said input circuit exceeding said triggering voltage amplitude;

delay means having a delay equal to the period of said scan lines coupled between said electro-optical means and said quantizing means for applying said image signals to the input circuit of said quantizing means; and control means independently coupled between said electro-optical means and said input circuit of said quantizing means for varying said triggering voltage amplitude from scan line to scan line in accordance with the maximum amplitude of the image signals during a scan line so that the image signals of each line are quantized at a fixed percentage of their maximum amplitude during the line despite variations in the maximum amplitude of said image signals from scan line to scan line.

13. In a system for generating uniform amplitude electrical signals representing printed alpha-numeric characters on a document, the combination comprising:

electro-optical means for successively scanning each character on said document in a series of scan lines to generate electrical image signals, said signals being subject to variations in amplitude;

circuit means having an input circuit and having a first output voltage responsive to signals in said input circuit below a triggering voltage amplitude, and having a second output voltage responsive to signals in said input circuit exceeding said triggering voltage amplitude;

delay means having a delay equal to the period of said scan lines coupled between said electro-optical means and said circuit means for applying said image signals to the input circuit of said circuit means; and control means independently coupled between said electro-optical means and said input circuit of said circuit means for varying said triggering voltage amplitude from scan line to scan line in accordance with the maximum amplitude of the image signals during a scan line so that the image signals of each line trigger said circuit means at a fixed percentage of their maximum amplitude during the line despite variations in the amplitude of said image signals.

14. In a system for generating uniform amplitude electrical signals representing printed alpha-numeric characters on a document, the combination comprising:

a source of image signals in a series of scan lines representative of said characters, said signals being subject to undesired variations;

pulse generating means, having an input circuit, for generating constant amplitude output pulses in response to signals in said input circuit exceeding a triggering voltage amplitude;

delay means having a delay equal to the period of said scan lines coupled between said source and said pulse generating means for applying said image signals to the input circuit of said pulse generating means; and control means independently coupled between said source and said input circuit of said pulse generating means for varying said triggering voltage amplitude from scan line to scan line in accordance with the maximum amplitude of the image signals during a scan line so that the image signals of each line trigger said pulse generating means at a fixed percentage of their maximum amplitude during the line despite variations in the maximum amplitude of said image signals from scan line to scan line.

References Cited by the Examiner

UNITED STATES PATENTS 3,146,422 8/1964 Greanias et al. ---- 235—61.115

ROBERT C. BAILEY, *Primary Examiner.*

G. D. SHAW, *Assistant Examiner.*